United States Patent
Zhang et al.

(10) Patent No.: US 11,895,185 B2
(45) Date of Patent: Feb. 6, 2024

(54) NODE SYNCHRONIZATION METHOD AND APPARATUS, DEVICE AND STORAGE MEDIUM

(71) Applicant: Inspur Suzhou Intelligent Technology Co., Ltd., Suzhou (CN)

(72) Inventors: Kai Zhang, Jinan (CN); Peng Zhao, Jinan (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/038,919

(22) PCT Filed: Sep. 28, 2021

(86) PCT No.: PCT/CN2021/121207
§ 371 (c)(1),
(2) Date: May 25, 2023

(87) PCT Pub. No.: WO2022/116660
PCT Pub. Date: Jun. 9, 2022

(65) Prior Publication Data
US 2023/0388376 A1    Nov. 30, 2023

(30) Foreign Application Priority Data
Dec. 3, 2020   (CN) .......................... 202011394125.9

(51) Int. Cl.
*H04L 67/1095* (2022.01)
(52) U.S. Cl.
CPC .............................. *H04L 67/1095* (2013.01)
(58) Field of Classification Search
CPC .................................................. H04L 67/1095
See application file for complete search history.

(56) References Cited

U.S. PATENT DOCUMENTS

| | | | |
|---|---|---|---|
| 9,021,296 B1 * | 4/2015 | Kiselev | G06F 3/0647 714/6.23 |
| 9,596,301 B2 | 3/2017 | Mosier et al. | |

(Continued)

FOREIGN PATENT DOCUMENTS

| | | |
|---|---|---|
| CN | 103401951 | 11/2013 |
| CN | 106302700 | 1/2017 |

(Continued)

OTHER PUBLICATIONS

International Search Report and Written Opinion of corresponding PCT application No. PCT/CN2021/121207 dated Dec. 30, 2021 including translations (15 pages).

(Continued)

*Primary Examiner* — Shean Tokuta
(74) *Attorney, Agent, or Firm* — Crowell & Moring LLP

(57) ABSTRACT

A node synchronization method and apparatus, an electronic device, and a computer-readable storage medium, include: acquiring node data sent by each slave node; obtaining a target cluster parameter from each piece of node data, and obtaining a standard cluster parameter by using the target cluster parameter based on an event queue length; determining an authorized slave node according to the standard cluster parameter, and judging whether a quantity of authorized slave nodes is greater than a quantity threshold; and if the quantity is greater than the quantity threshold, performing event playback on the authorized slave node by using a cluster event based on the standard cluster parameter; or if the quantity is not greater than the quantity threshold, controlling the authorized slave node to perform status synchronization on an unauthorized slave node, and performing event playback on the authorized slave node by using a cluster event after status synchronization.

20 Claims, 2 Drawing Sheets

(56) References Cited

U.S. PATENT DOCUMENTS

| | | | |
|---|---|---|---|
| 9,697,226 B1* | 7/2017 | Youngworth | G06F 3/0655 |
| 10,567,499 B1* | 2/2020 | Chen | G06F 3/065 |
| 2015/0006846 A1* | 1/2015 | Youngworth | G06F 3/0619 |
| | | | 711/216 |
| 2015/0113314 A1* | 4/2015 | Bulkowski | G06F 11/203 |
| | | | 714/4.11 |
| 2015/0161016 A1* | 6/2015 | Bulkowski | G06F 16/278 |
| | | | 714/4.2 |
| 2017/0255499 A1* | 9/2017 | Laden | H04L 67/1095 |
| 2018/0004777 A1* | 1/2018 | Bulkowski | G06F 16/2255 |
| 2018/0173747 A1* | 6/2018 | Baird, III | G06F 16/273 |
| 2018/0285211 A1* | 10/2018 | Eberhard | G06F 11/1658 |

FOREIGN PATENT DOCUMENTS

| | | | | |
|---|---|---|---|---|
| CN | 106484542 | | 3/2017 | |
| CN | 109639794 | | 4/2019 | |
| CN | 109923523 A | * | 6/2019 | G06F 9/3009 |
| CN | 110109752 A | * | 8/2019 | G06F 9/4881 |
| CN | 110138863 | | 8/2019 | |
| CN | 110636128 | | 12/2019 | |
| CN | 110909076 | | 3/2020 | |
| CN | 110933137 | | 3/2020 | |
| CN | 110955523 A | * | 4/2020 | G06F 9/5088 |
| CN | 111028902 A | * | 4/2020 | |
| CN | 111818159 A | * | 10/2020 | G06F 11/0709 |
| CN | 112202687 | | 1/2021 | |
| CN | 112202687 A | * | 1/2021 | H04L 47/50 |
| CN | 112202687 B | * | 5/2021 | H04L 47/50 |
| WO | WO-2015057240 A1 | * | 4/2015 | G06F 11/00 |
| WO | WO-2022116660 A1 | * | 6/2022 | H04L 47/50 |

OTHER PUBLICATIONS

First search report of corresponding CN priority application (CN202011394125.9) dated Jan. 8, 2021 (2 pages).
First Office Action of corresponding CN priority application (CN202011394125.9) dated Jan. 15, 2021 including translation (8 pages).
1st Supplementary search report of corresponding CN priority application (CN202011394125.9) dated Feb. 1, 2021 (2 pages).
2nd Office Action of corresponding CN priority application (CN202011394125.9) dated Feb. 7, 2021 including translation (8 pages).
2nd Supplementary search report of corresponding CN priority application (CN202011394125.9) dated Feb. 18, 2021 (1 page).

* cited by examiner

NODE SYNCHRONIZATION METHOD AND APPARATUS, DEVICE AND STORAGE MEDIUM

This application is the national phase application of International Application No. PCT/CN2021/121207, filed Sep. 28, 2021, which claims priority to Chinese Patent Application No. 202011394125.9, filed on Dec. 3, 2020 in China National Intellectual Property Administration and entitled "Node Synchronization Method and Apparatus, Device, and Storage Medium", the contents of each of which are incorporated by reference in their entirety.

FIELD

The present application relates to the field of data synchronization technologies, and in particular, to a node synchronization method, a node synchronization apparatus, an electronic device, and a computer-readable storage medium.

BACKGROUND

A consistency protocol is a basis for implementation of a distributed cluster. The Paxos protocol is one of important consistency protocols. The Paxos protocol may substantially be divided into two phases: a propose-promise phase (a phase in which a proposal is presented) and a commit-accept phase (a phase in which the proposal is accepted). It is proved by use of the two phases of the protocol that consistency of a status in the distributed cluster might be maintained in the related art. However, the consistency cannot be ensured in case of a cluster node change, for example, a node leaves or a new node joins in.

Therefore, how to solve the problem of inapplicability of the related art to a cluster in which nodes dynamically change is a technical problem those skilled in the art need to solve.

SUMMARY

In view of this, an objective of the present application is to provide a node synchronization method, a node synchronization apparatus, an electronic device, and a computer-readable storage medium. Consistency of a status of a node in a cluster is ensured in case of a dynamic node change.

In order to solve the foregoing technical problem, the present application provides a node synchronization method, including:

acquiring node data sent by each slave node;

obtaining a target cluster parameter from each piece of node data, and obtaining a standard cluster parameter by using the target cluster parameter based on an event queue length;

determining an authorized slave node according to the standard cluster parameter, and judging whether a quantity of authorized slave nodes is greater than a quantity threshold; and if the quantity is greater than the quantity threshold, performing event playback on the authorized slave node by using a cluster event based on the standard cluster parameter; or if the quantity is not greater than the quantity threshold, controlling the authorized slave node to perform status synchronization on an unauthorized slave node, and performing event playback on the authorized slave node by using a cluster event after status synchronization.

Alternatively, the performing event playback on the authorized slave node by using a cluster event based on the standard cluster parameter includes:

determining, from a plurality of cluster events, a target cluster event whose event number is the standard cluster parameter plus one;

sending the target cluster event to the authorized slave node;

updating the target cluster event according to an event numbering sequence after receipt confirmation information sent by all authorized slave nodes is acquired; and if a target event number corresponding to the target cluster event is greater than the target cluster parameter, determining that event playback is completed.

Alternatively, the determining an authorized slave node according to the standard cluster parameter includes:

judging whether a slave node cluster parameter in each piece of node data is less than the standard cluster parameter; and if the slave node cluster parameter is not less than the standard cluster parameter, determining the slave node as the authorized slave node; or if the slave node cluster parameter is less than the standard cluster parameter, determining the slave node as the unauthorized slave node.

Alternatively, the controlling the authorized slave node to perform status synchronization on an unauthorized slave node includes:

sending a synchronization instruction to a target authorized slave node, whereby the target authorized slave node sends corresponding target node data to the unauthorized slave node to make a node cluster parameter corresponding to the unauthorized slave node equal to that corresponding to the target authorized slave node;

updating the quantity of authorized slave nodes; and when the quantity is greater than the quantity threshold, determining that status synchronization is completed.

Alternatively, the acquiring node data sent by each slave node includes:

judging whether an own identity is a master node acknowledged by other nodes;

if the own identity is the master node, sending a status recovery request to each slave node in a current network topology; and acquiring the node data sent by each slave node in response to the status recovery request.

Alternatively, the judging whether an own identity is a master node acknowledged by other nodes includes:

acquiring a node serial number corresponding to each of the other nodes in the current network topology;

judging whether an own serial number is a minimum node serial number;

if the own serial number is the minimum node serial number, judging whether a loyalty relationship is successfully established with all of the other nodes; and if the loyalty relationship is successfully established, determining that the own identity is the master node.

Alternatively, after event playback is completed, the method further includes:

determining a new event number by using the target cluster parameter according to an event numbering sequence;

sending a new cluster event corresponding to the new event number to each authorized slave node;

if receipt confirmation information sent by all the authorized slave nodes is acquired, sending flag bit modification information to each authorized slave node, whereby the authorized slave node modifies a flag bit corresponding to the new cluster event; and if modification confirmation information sent by all the authorized slave nodes is acquired, redetermining the new event number.

The present application also provides a node synchronization apparatus, including:

an acquisition module, configured to acquire node data sent by each slave node;

a standard determining module, configured to obtain a target cluster parameter from each piece of node data, and obtain a standard cluster parameter by using the target cluster parameter based on an event queue length;

a quantity judgment module, configured to determine an authorized slave node according to the standard cluster parameter, and judge whether a quantity of authorized slave nodes is greater than a quantity threshold; and a first synchronization module, configured, if the quantity is greater than the quantity threshold, to perform event playback on the authorized slave node by using a cluster event based on the standard cluster parameter; or a second synchronization module, configured, if the quantity is not greater than the quantity threshold, to control the authorized slave node to perform status synchronization on an unauthorized slave node, and perform event playback on the authorized slave node by using a cluster event after status synchronization.

The present application also provides an electronic device, including a memory and a processor.

The memory is configured to store a computer program.

The processor is configured to execute the computer program to implement the foregoing node synchronization method.

The present application also provides a computer-readable storage medium, configured to store a computer program. The computer program is executed by a processor to implement the foregoing node synchronization method.

According to the node synchronization method provided in the present application, the node data sent by each slave node is acquired. The target cluster parameter is obtained from each piece of node data, and the standard cluster parameter is obtained by using the target cluster parameter based on the event queue length. The authorized slave node is determined according to the standard cluster parameter, and whether the quantity of authorized slave nodes is greater than the quantity threshold is judged. If the quantity is greater than the quantity threshold, event playback is performed on the authorized slave node by using the cluster event based on the standard cluster parameter; or if the quantity is not greater than the quantity threshold, the authorized slave node is controlled to perform status synchronization on the unauthorized slave node, and event playback is performed on the authorized slave node by using the cluster event after status synchronization.

Thus, it might be seen that, in the method, after a dynamic change such as a node leaves or joins occurs on a cluster, sufficient authorized slave nodes whose statuses are new enough are required to be selected before a service is externally provided again. The node data in each slave node may represent an event execution situation corresponding to the slave node. In an event execution process of the slave node, a corresponding node cluster parameter may change accordingly. The node cluster parameter may represent a status of the node. The target cluster parameter corresponds to a latest executable event acquired by each slave node. Since an acquired event may not be executed immediately, and the event queue length in each slave node is limited, the standard cluster parameter determined based on the target cluster parameter may represent that an event to be completed before the event corresponding to the target cluster parameter is acquired, and may be used as a standard for judging whether the status of the slave node is new enough. After the authorized slave node is determined by using the target cluster parameter, whether the quantity of authorized slave nodes is greater than the quantity threshold is judged. If the quantity is greater than the quantity threshold, event playback may be performed on the authorized slave node to synchronize each authorized slave node. If the quantity is not greater than the quantity threshold, it indicates that there are insufficient authorized slave nodes. Therefore, the authorized slave node is controlled to perform status synchronization on the unauthorized slave node to change part of unauthorized slave nodes into authorized slave nodes, and event playback is performed after status synchronization is ended, to synchronize each authorized slave node. In a manner of redetermining an authorized slave node and performing event playback, an authorized slave node may be redetermined and synchronized in a case that a node leaves or joins, whereby data consistency is ensured, and the problem of inapplicability of the related art to a cluster in which nodes dynamically change is solved.

In addition, the present application also provides the node synchronization apparatus, the electronic device, and the computer-readable memory medium, which have the foregoing beneficial effects.

BRIEF DESCRIPTION OF THE DRAWINGS

In order to describe the technical solutions in embodiments of the present application or the related art more clearly, the drawings required to be used in descriptions about the embodiments or the related art will be described briefly below.

Apparently, the drawings in the description below are merely the embodiments of the present application. Those ordinarily skilled in the art may further obtain other drawings according to the provided drawings without creative work.

DETAILED DESCRIPTION

In order to make the objective, the technical solutions, and the advantages of the embodiments of the present application clearer, the technical solutions in the embodiments of the present application will be described clearly and completely below with reference to the drawings in the embodiments of the present application. Clearly, the described embodiments are not all but some embodiments of the present application. All other embodiments obtained by those ordinarily skilled in the art based on the embodiments in the present application without creative work shall fall within the protection scope of the present application.

Figure 1:
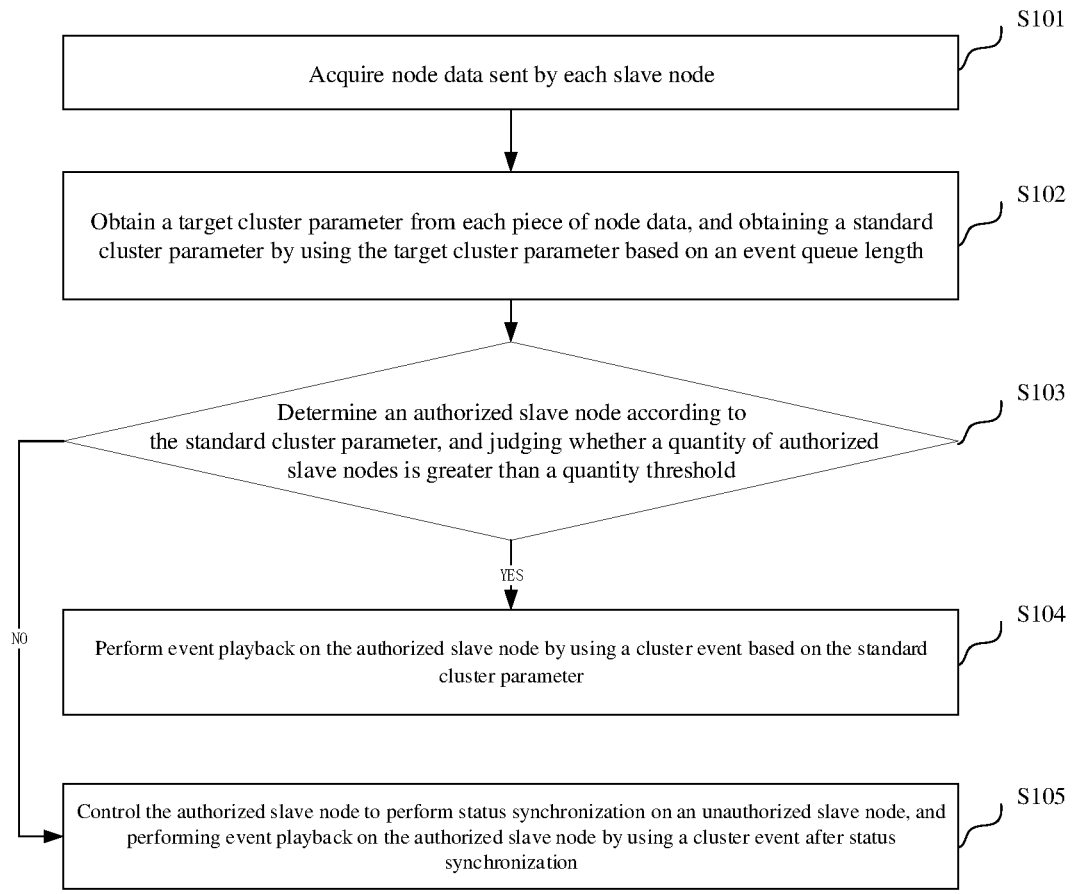
FIG. 1 is a flowchart of a node synchronization method according to an embodiment of the present application.

Refer to FIG. 1. FIG. 1 is a flowchart of a node synchronization method according to an embodiment of the present application. The method includes the following steps.

S101: Acquiring node data sent by each slave node.

It is to be noted that some or all steps of the node synchronization method provided in the present application may be performed by a specified electronic device. There may be one specified electronic device, for example, one computer or server. Alternatively, there may be a plurality of electronic devices, for example, a plurality of computers and/or a plurality of servers serve as electronic devices. The electronic device may be any node in a cluster, for example, a node with a smallest Internet Protocol (IP) address, or a node with a smallest number, or a node acknowledged by each other node. The electronic device may be referred to as a master node. A node in the cluster except the master node may be referred to as a slave node. In some embodiments, in a possible implementation, the electronic device may include the following components.

1: A Network Topology Manager (NTM): the NTM is started when a Paxos Monitor (PM) service (a service in the electronic device, used for implementing node synchronization) is started, and is configured to discover and detect another PM node in a network, and establish a network topology view. Content of the network topology view is a local node and a screened visible PM node list (and a group of port numbers). PM nodes in the network topology view are mutually cluster candidate members. During initialization of the cluster, when a cluster creation command may be executed on any node, the node is selected as a master (that is, the master node), and all PM nodes in a view of the node are required to return respective topology views. An NTM component on the master constructs a cluster view according to returned view information. The cluster view is a maximum topology view which includes the master and in which nodes are associated in pairs. The node in the cluster view is allocated with an ordered unique Identifier (ID). An ID of the master is minimum. The master further predetermines a cluster ID (that is, a node serial number) with all the nodes in the cluster view to complete a subsequent operation for cluster creation. The master node may subsequently be redetermined by using the node serial number.

If the master node collapses or is disconnected from the other nodes during running of the cluster, the other nodes in the cluster may select the node with a minimum ID from the original cluster view and a local topology view intersection set as a new master, and send topology views of the local nodes to the master. The NTM ensures that after a network environment gets stable, each node may be in a specific topology view and different topology views have no common nodes. Therefore, there is a unique master in the cluster view, and conflicts are avoided.

2: The master (a master node component): the master maintains the cluster by maintaining a loyalty relationship with a slave, and initiates a transaction to the slave during existence of the loyalty relationship. Only a master component on the master node is activated, and a master component on another node remains silent. From the start of creation of the cluster, the master keeps pushing an event sequence in which levels continuously increase from 1.

3: The slave (a slave node component): it responds to a request of the master. Slave components on all the nodes are activated, and invoke corresponding interfaces to read and write a Non-Volatile Storage (NVS) after receiving the request of the master. The slave may maintain a group of cluster statuses with levels (that is, cluster parameters). The level is initially 0. The slave requires to perform an event (that is, an event) to change the cluster status and the cluster parameter after receiving the event sequence in which the levels continuously increase from 1. A level corresponding to a cluster status after event application may be the same as a latest event level (an event number) that is applied. The slave stores a circular queue (that is, a cluster queue) of at most N to-be-executed events. Each item of the queue includes an event of one level and a flag big, and an initial value is false. When the event is confirmed by more than half of the nodes, that is, more than half of the nodes determines that the event is received, the master may notify the slave to modify the flag bit to true, such that each slave node is allowed to execute the event when necessary. This queue is also stored in the NVS.

4: A Transaction Channel (TC) (a TC component): this component maintains a point-to-point message channel between nodes of each pair for every type of cluster transaction, and is essentially a group of paired ports on two PM nodes. Particularly, the TC is initialized after the PM service is started to automatically complete pairing of reserved ports in a PM, and an obtained channel is used for sending a view message of the NTM. In addition, the TC may further reserve a group of transaction dedicated ports (the ports may be virtualization of the reserved ports in the PM) for each visible PM node. The NTM may add port information to the topology view for sending to the master together. After completing constructing the cluster view, the master completes port pairing of a master side, and sends the cluster view to all the nodes in the cluster through the channel specially for the NTM. After receiving this message, the slave node completes port pairing of a slave side. Hereto, a TC connection is established.

5: The NVS (an NVS interface): it packages a read-write interface of the NVS provided by a system. The system and a storage medium are required to prevent a loss of the NVS caused by a node collapse.

The node data is data used in each node for representing an event execution status, and may in some embodiments include an event status, an event number (that is, an event level), a cluster status, a cluster parameter (that is, a cluster level), an event queue, and the like. Specific content of the node data may be set as practically required. When a node dynamically joins or leaves the cluster, to ensure consistency of each node in the cluster, the node data sent by each slave node is required to be acquired to determine an asynchronous event according to each piece of node data, and the event is played back to ensure consistency of data on each node to further ensure consistency of a status of the node.

In a specific implementation, step S101 may include the following steps.

Step 11: Judging whether an own identity is a master node acknowledged by another node.

Step 12: If the own identity is the master node, sending a status recovery request to each slave node in a current network topology.

Step 13: Acquiring the node data sent by each slave node in response to the status recovery request.

Whether the own identity is the master node is required to be judged before the node data is acquired. Since a case that a node dynamically leaves or joins may reoccur in a process of determining the master node, the master node is a node acknowledged by all the slave nodes. Therefore, a unique master node might be determined accurately, and a synchronization error caused by existence of a plurality of master nodes or absence of the master node might be prevented. After it is determined that the own identity is the master node, the status recovery request (that is, a status request) is sent to each slave node in the current network topology. The current network topology is a network topology including remaining nodes after the node dynamically changes (joins or leaves). After the master node is determined, all the other nodes in the current network topology except the master node are slave nodes. After receiving the status recovery request, the slave node actively sends its own node data to the master node. The master node waits for acquiring the node data sent by each slave node in response to the status recovery request.

In some embodiments, in a possible implementation, step 11 may in some embodiments include the following steps.

Step 21: Acquiring a node serial number corresponding to each other node in the current network topology.

Step 22: Judging whether an own serial number is a minimum node serial number.

Step 23: If the own serial number is the minimum node serial number, judging whether a loyalty relationship is successfully established with all other nodes.

Step 24: If the loyalty relationship is successfully established, determining that the own identity is the master node.

In order to prevent, in the process of determining the master node, the case that a node dynamically leaves or joins the cluster, in the present embodiment, the loyalty relationship is used to represent an acknowledgment of the slave node when the master node is determined. If the loyalty relationship is successfully established, it indicates that the slave node acknowledges the node as the master node. In some embodiments, when the master node is determined, the current network topology is determined first. The node serial number corresponding to the other node in the current network topology except the node is acquired. The obtained node serial number is compared with its own serial number to judge whether the own serial number is a minimum node serial number. If the own serial number is the minimum node serial number, it indicates that the node may be used as the master node. Therefore, an attempt is made to establish the loyalty relationship with the other node, and whether the loyalty relationship is successfully established with all the other nodes is judged. In some embodiments, the loyalty relationship may be established by using a ballot number (a ballot value). The ballot number is an integral value increasing from 0, and is a proof of the loyalty relationship between the master (that is, the master node) and the slave (that is, the slave node). When initialized, the slave may set a ballot number recognized by the slave to 0. When the master node is determined, a node with a minimum serial number may send a ballot request including a ballot number to all the other nodes in a current cluster view (that is, a current network view) by taking 1 as an initial value, to query each slave whether to recognize the ballot number. If a ballot number currently recognized by the slave is not greater than the received ballot number, the ballot number recognized by the slave is modified to this ballot number, and a success message is returned to the master, added with the latest recognized ballot number. If a ballot number currently recognized by the slave is greater than the received ballot number, the salve returns a failure message to the master, added with a previously recognized ballot number. If all the slaves return success messages to the master, the master considers that the loyalty relationship has been established with all the other nodes, and determines itself as the master node. If a slave returns failure message, the master may select a maximum from a ballot number received by the master, determines the maximum plus one as a new ballot number, and retries a ballot request. Since the NTM ensures that there is only one master in the cluster view after network and node environments get stable, and only the master has a permission to add a ballot number, this process finally succeeds, and a condition of entering the next step is satisfied. If the loyalty relationship is successfully established, it may be determined that the own identity is the master node.

S102: Obtaining a target cluster parameter from each piece of node data, and obtaining a standard cluster parameter by using the target cluster parameter based on an event queue length.

The target cluster parameter represents a latest event acquired by all the slave nodes. There may be a communication error when an event is sent, and as a result, some slave nodes cannot receive the event sent by the master node. Therefore, when the target cluster parameter is determined, it is necessary to acquire a corresponding latest event number from each piece of node data and determine the target cluster parameter from each latest event number. In some embodiments, if the event number is a positive integer sequence gradually increasing from 0, the target cluster parameter is a maximum latest event number. In another implementation, a corresponding event status may be set for each event, which is initially false. When determining that all the slave nodes acquire the event, the master node may send an instruction to each slave node to modify the event status to true, to indicate that the event is executable. Since only an executable event is meaningful, when the target cluster parameter is determined, an event number whose event status is true may be determined first, and a maximum is determined from the event number as the target cluster parameter. An event queue is used for storing a to-be-executed event in a first in first out mode. Since the event queue is limited in length, after a new event is acquired, a first event at a front end of the event queue is required to be removed from the queue. If the event removed from the queue cannot be executed immediately, there may be an event execution error, and the slave node is deauthorized to become an unauthorized slave node, and cannot participate in a subsequent process. After a dynamic node change occurs, and data playback is performed again, it is necessary to distinguish an authorized slave node from an unauthorized slave node, so as to externally provide a service again by using the authorized slave node as a cluster to ensure data consistency. In order to achieve the foregoing objective, after determining that a slave node acquires an event corresponding to the target cluster parameter before the dynamic node change, standard data, that is, the standard cluster parameter, for distinguishing whether the slave node is an authorized slave node may be obtained based on the event queue length. In some embodiments, if the event queue length is N, the target cluster parameter is L, and the event number is the positive integer sequence gradually increasing from 0, each slave node may serve as an authorized slave node only after completing executing events whose event numbers are L to N.

S103: Determining an authorized slave node according to the standard cluster parameter, and judging whether a quantity of authorized slave nodes is greater than a quantity threshold.

After the standard cluster parameter is determined, the authorized slave node may be determined by using the standard cluster parameter, whether the quantity of authorized slave nodes is greater than the quantity threshold is judged. The quantity threshold is a threshold of various nodes for externally providing a service as a new cluster. A specific value of the threshold is not limited, for example, may be half of the slave nodes in the current network topology. Whether the quantity of authorized slave nodes is greater than the quantity threshold may be judged to judge whether the authorized slave nodes may currently provide a service as a cluster after synchronized by event playback.

In some embodiments, the step of determining an authorized slave node according to the standard cluster parameter may include the following steps.

Step 31: Judging whether a slave node cluster parameter in each piece of node data is less than the standard cluster parameter.

Step 32: If the slave node cluster parameter is not less than the standard cluster parameter, determining the slave node as the authorized slave node.

Step 33: If the slave node cluster parameter is less than the standard cluster parameter, determining the slave node as the unauthorized slave node.

In the present embodiment, the node data further includes a slave node cluster parameter, that is, the cluster level. The cluster parameter may change with execution of the event, and after an event is executed, the cluster parameter may be updated to an event number corresponding to the event. Therefore, when the authorized slave node is determined, whether the slave node cluster parameter in each piece of node data is less than the standard cluster parameter may be judged. If the slave node cluster parameter is not less than the standard cluster parameter, it indicates that the node is an authorized slave node before the dynamic node change occurs, and thus the node may still be determined as an authorized slave node. If the slave node cluster parameter is less than the standard cluster parameter, it indicates that the node is an unauthorized slave node before the dynamic node change occurs and data consistency cannot be achieved even though data playback is performed on the slave node, and thus the slave node is determined as an unauthorized slave node.

S104: If the quantity is greater than the quantity threshold, performing event playback on the authorized slave node by using a cluster event based on the standard cluster parameter.

If the quantity is greater than the quantity threshold, it indicates that the authorized slave node may externally provide a service as a cluster after synchronized by event playback. Therefore, event playback may be performed on the authorized slave node by using the cluster event based on the standard cluster parameter. Event playback is resending an event after the standard cluster parameter to each authorized slave node, to execute each event to ensure synchronization between the authorized slave nodes. In some embodiments, the step of performing event playback on the authorized slave node by using a cluster event based on the standard cluster parameter may include the following steps.

Step 41: Determining, from a plurality of cluster events, a target cluster event whose event number is the standard cluster parameter plus one.

Step 42: Sending the target cluster event to the authorized slave node.

Step 43: Updating the target cluster event according to an event numbering sequence after receipt confirmation information sent by all authorized slave nodes is acquired.

Step 44: If a target event number corresponding to the target cluster event is greater than the target cluster parameter, determining that event playback is completed.

When event playback is performed, the target cluster event is determined first based on the standard cluster parameter. In the present embodiment, the event number is a positive integer sequence that gradually increases, so that the cluster event whose event number is the standard cluster parameter plus one is determined as the target cluster event. The determined target cluster event is sent to each authorized slave node, such that each authorized slave node acquires the target cluster event. After the receipt confirmation information sent by all the authorized slave nodes is acquired, the target cluster event is updated according to the event numbering sequence. If the target event number corresponding to the target cluster event is not greater than the target cluster parameter, it indicates that an event having been sent to each authorized slave node before the dynamic node change occurs is yet not completely synchronized, so that step 42 may be performed. If the target event number corresponding to the target cluster event is greater than the target cluster parameter, it indicates that all events that have been sent have been resent, and it may be determined that event playback is completed.

In some embodiments, in a specific implementation, the master starts to submit events whose levels start from L+1, and then starts to normally submit events whose levels continuously increase. If a level of a currently submitted event is L_s, after receiving the event, the slave side compares the level of the event with a level L_c of a previous event confirmed by the slave node.

In case of L_s=L_c+1, the currently received event is written to the NVS, an event status being false, and a successful submission confirmation corresponding to L_s is returned to the master.

In case of L_s<L_c+1, the slave returns a success confirmation corresponding to L_c to the master.

In case of L_s>L_c+1, after a currently applied event is executed, the slave clears the to-be-applied event queue stored in the NVS of the slave, and sends an update request whose parameter is L_s to the master. After receiving the request, the master first deauthorizes the slave (referred to as a requesting slave) to determine the slave as an unauthorized slave node, then waits for a successful submission confirmation returned by another specific slave for an event whose level is L_s, and after acquiring the successful submission confirmation, sends the update request to the slave (referred to as a target slave). The target slave suspends execution of the event, and synchronizes its own data and event queue to the requesting slave. After successful synchronization, the requesting slave is reauthorized. After acquiring successful submission confirmations sent by all the slaves, the master sends flag bit modification information to modify the event status to true.

Further, in another implementation, in order to ensure that each authorized slave node completes executing the event sent during event playback and ensure that each authorized slave node acquires the event sent during event playback, after receipt confirmation information sent by all the authorized slave nodes is received, the flag bit modification information may be sent to each authorized slave node, so as to modify the event status of the event from false to true and execute the event after modification.

Step 105: If the quantity is not greater than the quantity threshold, controlling the authorized slave node to perform status synchronization on an unauthorized slave node, and performing event playback on the authorized slave node by using a cluster event after status synchronization.

If the quantity of authorized slave nodes is not greater than the quantity threshold, it is necessary to increase the quantity of authorized slave nodes, that is, adjust a plurality of unauthorized slave nodes to authorized slave nodes, so as to externally provide a service as a cluster after event playback is completed. In some embodiments, the authorized slave node may be controlled to perform status synchronization on the unauthorized slave node, such that the unauthorized slave node may have same data as the authorized slave node. In some embodiments, a process of controlling the authorized slave node to perform status synchronization on the unauthorized slave node may include the following steps.

Step 51: Sending a synchronization instruction to a target authorized slave node, whereby the target authorized slave node sends corresponding target node data to the unauthorized slave node to make a node cluster parameter corresponding to the unauthorized slave node equal to that corresponding to the target authorized slave node.

Step 52: Updating the quantity of authorized slave nodes.

Step 53: When the quantity is greater than the quantity threshold, determining that status synchronization is completed.

The target authorized slave node may be any quantity of authorized slave nodes. The synchronization instruction may be sent to the target authorized slave node to control the target authorized slave node to send the target node data the target authorized slave node has to the unauthorized slave node, such that the unauthorized slave node has the target node data, and satisfies an authorization condition to become an authorized slave node. During status synchronization, the quantity of authorized slave nodes is updated to determine whether status synchronization is completed. When the quantity is greater than the quantity threshold, it indicates that there are sufficient authorized slave nodes, so that status synchronization is completed. Event playback may be performed after status synchronization is completed.

Further, in a possible implementation, after event playback is completed, the authorized slave node and the unauthorized slave node may externally provide a service as a cluster. In some embodiments, the method may further include the following steps.

Step 61: Determining a new event number by using the target cluster parameter according to the event numbering sequence.

Step 62: Sending a new cluster event corresponding to the new event number to each authorized slave node.

Step 63: If receipt confirmation information sent by all the authorized slave nodes is acquired, sending flag bit modification information to each authorized slave node, whereby the authorized slave node modifies a flag bit corresponding to the new cluster event.

Step 64: Redetermining the new event number if modification confirmation information sent by all the authorized slave nodes is acquired.

For an event whose level is L_A, after all the authorized slaves return successful submission of the event, the master sends a submission confirmation for the event to all the authorized slaves. The slave receiving the submission confirmation may modify a flag bit corresponding to an event status of the event whose level is L_A to true, and returns successful modification to the master. The slave returning successful modification remains in an authorized state. After receiving successful submission returned by all the authorized slaves, the master starts to submit a next event.

With application of the node synchronization method provided in the embodiment of the present application, after a dynamic change such as a node leaves or joins occurs on a cluster, sufficient authorized slave nodes whose statuses are new enough are required to be selected before a service is externally provided again. The node data in each slave node may represent an event execution situation corresponding to the slave node. In an event execution process of the slave node, a corresponding node cluster parameter may change accordingly. The node cluster parameter may represent a status of the node. The target cluster parameter corresponds to a latest executable event acquired by each slave node. Since an acquired event may not be executed immediately, and the event queue length in each slave node is limited, the standard cluster parameter determined based on the target cluster parameter may represent that an event to be completed before the event corresponding to the target cluster parameter is acquired, and may be used as a standard for judging whether the status of the slave node is new enough. After the authorized slave node is determined by using the target cluster parameter, whether the quantity of authorized slave nodes is greater than the quantity threshold is judged. If the quantity is greater than the quantity threshold, event playback may be performed on the authorized slave node to synchronize each authorized slave node. If the quantity is not greater than the quantity threshold, it indicates that there are insufficient authorized slave nodes. Therefore, the authorized slave node is controlled to perform status synchronization on the unauthorized slave node to change part of unauthorized slave nodes into authorized slave nodes, and event playback is performed after status synchronization is ended, to synchronize each authorized slave node. In a manner of redetermining an authorized slave node and performing event playback, an authorized slave node may be redetermined and synchronized in a case that a node leaves or joins, whereby data consistency is ensured, and the problem of inapplicability of the related art to a cluster in which nodes dynamically change is solved.

The following describes a node synchronization apparatus provided in the embodiments of the present application. The node synchronization apparatus described below and the node synchronization method described above may correspondingly refer to each other.

Figure 2:
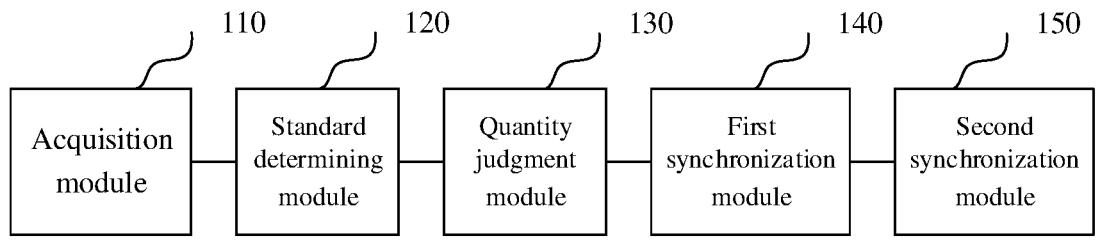
FIG. 2 is a schematic diagram of a structure of a node synchronization apparatus according to an embodiment of the present application.

Refer to FIG. 2. FIG. 2 is a schematic diagram of a structure of a node synchronization apparatus according to an embodiment of the present application, including:

an acquisition module 110, configured to acquire node data sent by each slave node;

a standard determining module 120, configured to obtain a target cluster parameter from each piece of node data, and obtain a standard cluster parameter by using the target cluster parameter based on an event queue length;

a quantity judgment module 130, configured to determine an authorized slave node according to the standard cluster parameter, and judge whether a quantity of authorized slave nodes is greater than a quantity threshold; and a first synchronization module 140, configured, if the quantity is greater than the quantity threshold, to perform event playback on the authorized slave node by using a cluster event based on the standard cluster parameter; or a second synchronization module 150, configured, if the quantity is not greater than the quantity threshold, to control the authorized slave node to perform status synchronization on an unauthorized slave node, and perform event playback on the authorized slave node by using a cluster event after status synchronization.

Alternatively, the first synchronization module 140 includes:

a target cluster event determining unit, configured to determine, from a plurality of cluster events, a target cluster event whose event number is the standard cluster parameter plus one;

an event sending unit, configured to send the target cluster event to the authorized slave node;

an event update unit, configured to update the target cluster event according to an event numbering sequence after receipt confirmation information sent by all authorized slave nodes is acquired; and a playback completion determining unit, configured, if a target event number corresponding to the target cluster event is greater than the target cluster parameter, to determine that event playback is completed.

Alternatively, the quantity judgment module 130 includes:

a cluster parameter judgment unit, configured to judge whether a slave node cluster parameter in each piece of node data is less than the standard cluster parameter; and a first determining unit, configured, if the slave node cluster parameter is not less than the standard cluster parameter, to determine the slave node as the authorized slave node; or a second determining unit, configured, if the slave node cluster parameter is less than the standard cluster parameter, to determine the slave node as the unauthorized slave node.

Alternatively, the second synchronization module 150 includes:

a synchronization instruction sending unit, configured to send a synchronization instruction to a target authorized slave node, whereby the target authorized slave node sends corresponding target node data to the unauthorized slave node to make a node cluster parameter corresponding to the unauthorized slave node equal to that corresponding to the target authorized slave node;

a quantity update unit, configured to update the quantity of authorized slave nodes; and a synchronization completion determining unit, configured, when the quantity is greater than the quantity threshold, to determine that status synchronization is completed.

Alternatively, the acquisition module 110 includes:

an identity judgment unit, configured to judge whether an own identity is a master node acknowledged by another node;

a request sending unit, configured, if the own identity is the master node, to send a status recovery request to each slave node in a current network topology; and an acquisition unit, configured to acquire the node data sent by each slave node in response to the status recovery request.

Alternatively, the identity judgment unit includes:

a node serial number acquisition subunit, configured to acquire a node serial number corresponding to each other node in the current network topology;

a minimum node serial number judgment subunit, configured to judge whether an own serial number is a minimum node serial number;

a loyalty relationship establishment subunit, configured, if the own serial number is the minimum node serial number, to judge whether a loyalty relationship is successfully established with all other nodes; and an identity determining subunit, configured, if the loyalty relationship is successfully established, to determine that the own identity is the master node.

Alternatively, the apparatus further includes:

a new event number determining module, configured to determine a new event number by using the target cluster parameter according to the event numbering sequence;

a new cluster event sending module, configured to send a new cluster event corresponding to the new event number to each authorized slave node;

a flag bit modification information sending module, configured, if receipt confirmation information sent by all the authorized slave nodes is acquired, to send flag bit modification information to each authorized slave node, whereby the authorized slave node modifies a flag bit corresponding to the new cluster event; and a redetermining module, configured to redetermine the new event number if modification confirmation information sent by all the authorized slave nodes is acquired.

The following describes an electronic device provided in the embodiments of the present application. The electronic device described below and the node synchronization method described above may correspondingly refer to each other.

Figure 3:
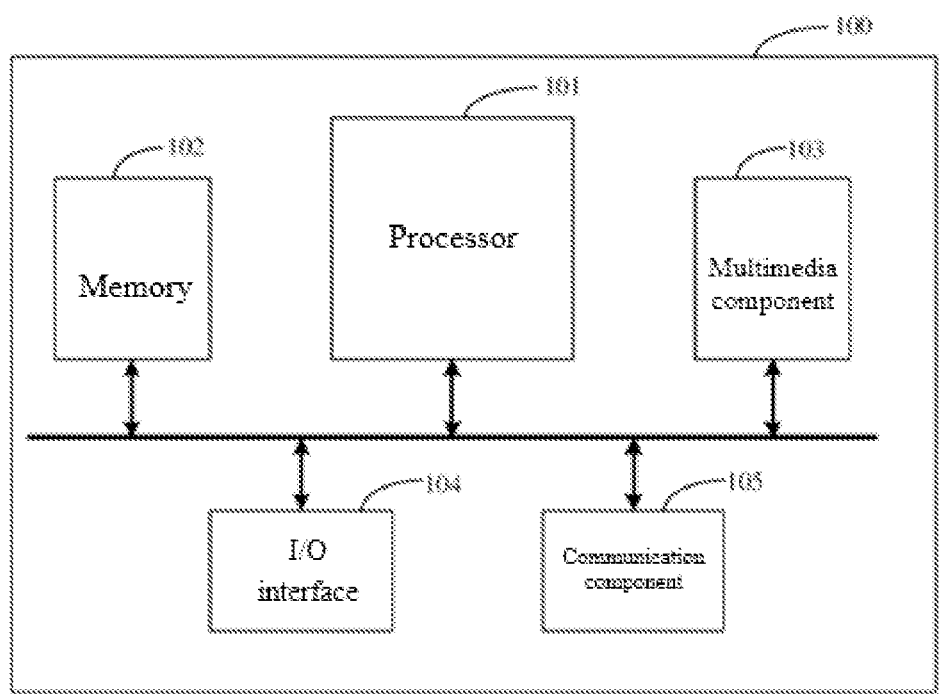
FIG. 3 is a schematic diagram of a structure of an electronic device according to an embodiment of the present application.

Refer to FIG. 3. FIG. 3 is a schematic diagram of a structure of an electronic device according to an embodiment of the present application. The electronic device 100 may include a processor 101 and a memory 102, and may further include one or more of a multimedia component 103, an information Input/Output (I/O) interface 104, and a communication component 105.

The processor 101 is configured to control overall operations of the electronic device 100, so as to complete all or some steps in the node synchronization method. The memory 102 is configured to store various types of data so as to support operations on the electronic device 100. For example, the data may include instructions for any application program or method operated on the electronic device 100, as well as data related to the application program. The memory 102 may be implemented by any type of volatile or non-volatile storage device or a combination thereof, for example, one or more of a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disk.

The multimedia component 103 may include a screen and an audio component. The screen may be, for example, a touch screen. The audio component is configured to output and/or input an audio signal. For example, the audio component may include a microphone configured to receive an external audio signal. The received audio signal may further be stored in the memory 102 or sent by the communication component 105. The audio component further includes at least one speaker configured to output an audio signal. The I/O interface 104 provides an interface between the processor 101 and another interface module such as a keyboard, a mouse, or a button. The button may be a virtual button or a physical button. The communication component 105 is configured for wired or wireless communication between the electronic device 100 and another device. Wireless communication is, for example, Wireless Fidelity (Wi-Fi), Bluetooth, Near Field Communication (NFC), 2nd-Generation (2G), 3rd-Generation (3G), 4th-Generation (4G), or a combination thereof. Therefore, the communication component 105 may correspondingly include a Wi-Fi component, a Bluetooth component, and an NFC component.

The electronic device 100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, to perform the node synchronization method provided in the foregoing embodiments.

The following describes a computer-readable memory medium provided in the embodiments of the present application. The computer-readable memory medium described below and the node synchronization method described above may correspondingly refer to each other.

The present application also provides a computer-readable storage medium. The computer-readable storage medium stores a computer program. The computer program is executed by a processor to implement the steps of the foregoing node synchronization method.

The computer-readable storage medium may include various media capable of storing program code, such as a U disk, a mobile hard disk, a ROM, a Random Access Memory (RAM), a magnetic disk, or an optical disk.

Each embodiment in the description is described progressively. Descriptions made in each embodiment focus on differences from the other embodiments, and the same or similar parts in each embodiment refer to the other embodiments. The apparatus disclosed in the embodiments corresponds to the method disclosed in the embodiments, and thus is described briefly, and related parts refer to the descriptions about the method.

Those skilled in the art may further realize that the units and the algorithm steps in each example described with reference to the embodiments disclosed herein may be implemented by electronic hardware, computer software, or a combination thereof. For clarity of description about the exchangeability of hardware and software, the compositions and the steps in each example have been generally described in the foregoing description according to functions. Whether these functions are executed by hardware or software depends on specific applications and design constraints of the technical solutions. Those skilled in the art may use different methods to implement the described functions for each particular application, but it should not be considered that the implementation goes beyond the scope of the present application.

The steps of the method or algorithm described with reference to the embodiments disclosed herein may directly be implemented by hardware, a software module executed by the processor, or a combination thereof. The software module may be arranged in a RAM, an internal memory, a ROM, an electrically programmable ROM, an EEPROM, a register, a hard disk, a removable disk, a Compact Disc Read-Only Memory (CD-ROM), or a storage medium in any other form well known in this art.

It is finally to be noted that relational terms herein, such as first and second, are only for distinguishing one entity or operation from another and do not necessarily require or imply the existence of any practical relation or sequence between these entities or operations. Moreover, terms "include" and "contain" or any other variation thereof is intended to cover nonexclusive inclusions, so that a process, a method, an object, or a device that includes a series of elements includes not only those elements but also other elements that are not clearly listed, or further includes elements intrinsic to the process, the method, the object, or the device.

The principle and implementations of the present application are described with specific examples herein. The above descriptions about the embodiments are only used to help understand the method of the present application and the core concept thereof. In addition, those ordinarily skilled in the art may make variations to the specific implementations and the application scope according to the concept of the present application. In summary, the content of the description should not be understood as a limitation on the present application.

What is claimed is:

1. A node synchronization method, comprising:
   acquiring node data sent by each slave node;
   obtaining a target cluster parameter from each piece of node data, and obtaining a standard cluster parameter by using the target cluster parameter based on an event queue length;
   determining an authorized slave node according to the standard cluster parameter, and judging whether a quantity of authorized slave nodes is greater than a quantity threshold; and
   in response to the quantity being greater than the quantity threshold, performing event playback on the authorized slave node by using a cluster event based on the standard cluster parameter; or
   in response to the quantity being not greater than the quantity threshold, controlling the authorized slave node to perform status synchronization on an unauthorized slave node, and performing event playback on the authorized slave node by using a cluster event after status synchronization.

2. The node synchronization method according to claim 1, wherein the performing event playback on the authorized slave node by using a cluster event based on the standard cluster parameter comprises:
   determining, from a plurality of cluster events, a target cluster event whose event number is the standard cluster parameter plus one;
   sending the target cluster event to the authorized slave node;
   updating the target cluster event according to an event numbering sequence after receipt confirmation information sent by all authorized slave nodes is acquired; and
   in response to a target event number corresponding to the target cluster event being greater than the target cluster parameter, determining that event playback is completed.

3. The node synchronization method according to claim 1, wherein the determining an authorized slave node according to the standard cluster parameter comprises:
   judging whether a slave node cluster parameter in each piece of node data is less than the standard cluster parameter; and
   in response to the slave node cluster parameter being not less than the standard cluster parameter, determining the slave node as the authorized slave node; or
   in response to the slave node cluster parameter being less than the standard cluster parameter, determining the slave node as the unauthorized slave node.

4. The node synchronization method according to claim 3, wherein the controlling the authorized slave node to perform status synchronization on an unauthorized slave node comprises:
   sending a synchronization instruction to a target authorized slave node, whereby the target authorized slave node sends corresponding target node data to the unauthorized slave node to make a node cluster parameter corresponding to the unauthorized slave node equal to that corresponding to the target authorized slave node;
   updating the quantity of authorized slave nodes; and
   when the quantity is greater than the quantity threshold, determining that status synchronization is completed.

5. The node synchronization method according to claim 1, wherein the acquiring node data sent by each slave node comprises:
   judging whether an own identity is a master node acknowledged by other nodes;

in response to the own identity being the master node, sending a status recovery request to each slave node in a current network topology; and acquiring the node data sent by each slave node in response to the status recovery request.

6. The node synchronization method according to claim 5, wherein the judging whether an own identity is a master node acknowledged by other nodes comprises:

acquiring a node serial number corresponding to each of the other nodes in the current network topology;

judging whether an own serial number is a minimum node serial number;

in response to the own serial number being the minimum node serial number, judging whether a loyalty relationship is successfully established with all of the other nodes; and in response to the loyalty relationship being successfully established, determining that the own identity is the master node.

7. The node synchronization method according to claim 1, wherein after event playback is completed, the method further comprises:

determining a new event number by using the target cluster parameter according to an event numbering sequence;

sending a new cluster event corresponding to the new event number to each authorized slave node;

in response to receipt confirmation information sent by all the authorized slave nodes being acquired, sending flag bit modification information to each authorized slave node, whereby the authorized slave node modifies a flag bit corresponding to the new cluster event; and in response to modification confirmation information sent by all the authorized slave nodes as being acquired, redetermining the new event number.

8. The node synchronization method according to claim 2, wherein the method further comprises:

in response to the target event number corresponding to the target cluster event being not greater than the target cluster parameter, sending the target cluster event to the authorized slave node.

9. An electronic device, comprising:

a memory and a processor, wherein the memory is storing a computer program; and the processor is configured to execute the computer program, wherein upon execution of the computer program, the processor is configured to:

acquire node data sent by each slave node;

obtain a target cluster parameter from each piece of node data, and obtain a standard cluster parameter by using the target cluster parameter based on an event queue length;

determine an authorized slave node according to the standard cluster parameter, and judge whether a quantity of authorized slave nodes is greater than a quantity threshold; and in response to the quantity being greater than the quantity threshold, perform event playback on the authorized slave node by using a cluster event based on the standard cluster parameter; or in response to the quantity being not greater than the quantity threshold, control the authorized slave node to perform status synchronization on an unauthorized slave node, and perform event playback on the authorized slave node by using a cluster event after status synchronization.

10. The electronic device according to claim 9, wherein in order to perform event playback on the authorized slave node by using a cluster event based on the standard cluster parameter, the processor, upon execution of the computer program, is configured to:

determine, from a plurality of cluster events, a target cluster event whose event number is the standard cluster parameter plus one;

send the target cluster event to the authorized slave node;

update the target cluster event according to an event numbering sequence after receipt confirmation information sent by all authorized slave nodes is acquired; and in response to a target event number corresponding to the target cluster event being greater than the target cluster parameter, determine that event playback is completed.

11. The electronic device according to claim 9, wherein in order to determine an authorized slave node according to the standard cluster parameter, the processor, upon execution of the computer program, is configured to:

judge whether a slave node cluster parameter in each piece of node data is less than the standard cluster parameter; and in response to the slave node cluster parameter being not less than the standard cluster parameter, determine the slave node as the authorized slave node; or in response to the slave node cluster parameter being less than the standard cluster parameter, determine the slave node as the unauthorized slave node.

12. The electronic device according to claim 11, wherein in order to control the authorized slave node to perform status synchronization on an unauthorized slave node, the processor, upon execution of the computer program, is configured to:

send a synchronization instruction to a target authorized slave node, whereby the target authorized slave node sends corresponding target node data to the unauthorized slave node to make a node cluster parameter corresponding to the unauthorized slave node equal to that corresponding to the target authorized slave node;

update the quantity of authorized slave nodes; and when the quantity is greater than the quantity threshold, determine that status synchronization is completed.

13. The electronic device according to claim 9, wherein in order to acquire node data sent by each slave node, the processor, upon execution of the computer program, is configured to:

judge whether an own identity is a master node acknowledged by other nodes;

in response to the own identity being the master node, send a status recovery request to each slave node in a current network topology; and acquire the node data sent by each slave node in response to the status recovery request.

14. The electronic device according to claim 13, wherein in order to judge whether an own identity is a master node acknowledged by other nodes, the processor, upon execution of the computer program, is configured to:

acquire a node serial number corresponding to each of the other nodes in the current network topology;

judge whether an own serial number is a minimum node serial number;

in response to the own serial number being the minimum node serial number, judge whether a loyalty relationship is successfully established with all of the other nodes; and in response to the loyalty relationship being successfully established, determine that the own identity is the master node.

15. The electronic device according to claim 9, wherein after event playback is completed, the processor, upon execution of the computer program, is further configured to:
- determine a new event number by using the target cluster parameter according to an event numbering sequence;
- send a new cluster event corresponding to the new event number to each authorized slave node;
- in response to receipt of confirmation information sent by all the authorized slave nodes being acquired, send flag bit modification information to each authorized slave node, whereby the authorized slave node modifies a flag bit corresponding to the new cluster event; and
- in response to modification confirmation information sent by all the authorized slave nodes being acquired, redetermine the new event number.

16. A non-transitory computer-readable storage medium, storing a computer program executable by a processor, wherein upon execution by the processor, the computer program is configured to cause the processor to:
- acquire node data sent by each slave node;
- obtain a target cluster parameter from each piece of node data, and obtain a standard cluster parameter by using the target cluster parameter based on an event queue length;
- determine an authorized slave node according to the standard cluster parameter, and judge whether a quantity of authorized slave nodes is greater than a quantity threshold; and
- in response to the quantity being greater than the quantity threshold, perform event playback on the authorized slave node by using a cluster event based on the standard cluster parameter; or
- in response to the quantity being not greater than the quantity threshold, control the authorized slave node to perform status synchronization on an unauthorized slave node, and perform event playback on the authorized slave node by using a cluster event after status synchronization.

17. The non-transitory computer-readable storage medium according to claim 16, wherein in order to performing event playback on the authorized slave node by using a cluster event based on the standard cluster parameter, the computer program, upon execution by the processor, is configured to cause the processor to:
- determine, from a plurality of cluster events, a target cluster event whose event number is the standard cluster parameter plus one;
- send the target cluster event to the authorized slave node;
- update the target cluster event according to an event numbering sequence after receipt confirmation information sent by all authorized slave nodes is acquired; and
- in response to a target event number corresponding to the target cluster event being greater than the target cluster parameter, determine that event playback is completed.

18. The non-transitory computer-readable storage medium according to claim 16, wherein in order to determine an authorized slave node according to the standard cluster parameter, the computer program, upon execution by the processor, is configured to cause the processor to:
- judge whether a slave node cluster parameter in each piece of node data is less than the standard cluster parameter; and
- in response to the slave node cluster parameter being not less than the standard cluster parameter, determine the slave node as the authorized slave node; or
- in response to the slave node cluster parameter being less than the standard cluster parameter, determine the slave node as the unauthorized slave node.

19. The non-transitory computer-readable storage medium according to claim 18, wherein in order to control the authorized slave node to perform status synchronization on an unauthorized slave node, the computer program, upon execution by the processor, is configured to cause the processor to:
- send a synchronization instruction to a target authorized slave node, whereby the target authorized slave node sends corresponding target node data to the unauthorized slave node to make a node cluster parameter corresponding to the unauthorized slave node equal to that corresponding to the target authorized slave node;
- update the quantity of authorized slave nodes; and
- when the quantity is greater than the quantity threshold, determine that status synchronization is completed.

20. The non-transitory computer-readable storage medium according to claim 16, wherein in order to acquiring node data sent by each slave node, the computer program, upon execution by the processor, is configured to cause the processor to:
- judge whether an own identity is a master node acknowledged by other nodes;
- in response to the own identity being the master node, send a status recovery request to each slave node in a current network topology; and
- acquire the node data sent by each slave node in response to the status recovery request.

* * * * *